(12) United States Patent
Lee

(10) Patent No.: US 8,531,622 B2
(45) Date of Patent: Sep. 10, 2013

(54) LIQUID CRYSTAL DISPLAY

(75) Inventor: Jaeho Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 720 days.

(21) Appl. No.: 12/591,607

(22) Filed: Nov. 24, 2009

(65) Prior Publication Data

US 2011/0051031 A1    Mar. 3, 2011

(30) Foreign Application Priority Data

Aug. 28, 2009  (KR) .......................... 10-2009-0080229

(51) Int. Cl.
*G02F 1/1333* (2006.01)
*G02F 1/1335* (2006.01)
(52) U.S. Cl.
USPC ............................................. 349/58; 349/70
(58) Field of Classification Search
USPC ............................................................ 349/58
See application file for complete search history.

(56) References Cited

U.S. PATENT DOCUMENTS

| 7,961,272 B2 * | 6/2011 | Kim ................................ 349/70 |
| 2010/0231828 A1 * | 9/2010 | Shimizu .......................... 349/70 |
| 2011/0116016 A1 * | 5/2011 | Mikubo et al. .................. 349/70 |

FOREIGN PATENT DOCUMENTS

| CN | 101236327 | 8/2008 |
| KR | 10-2008-0076258 A | 8/2008 |

* cited by examiner

*Primary Examiner* — Eric Wong
(74) *Attorney, Agent, or Firm* — McKenna Long & Aldridge, LLP

(57) ABSTRACT

A method for connecting lamps and an external power supply in a liquid crystal display is disclosed. The liquid crystal display comprises: a liquid crystal panel; a plurality of lamps for generating light to be irradiated onto the liquid crystal panel; a common board including a common electrode contacting the electrodes of the lamps; a bottom cover accommodating the lamps and the common board; and a socket connector provided at one side of the common board and electrically connecting an external power supply and the common electrode, wherein an electrical contact portion of the socket connector is exposed to the outside by a through hole passing through the common board and the bottom cover.

5 Claims, 8 Drawing Sheets

LIQUID CRYSTAL DISPLAY

This application claims the benefit of Korean Patent Application No. 10-2009-0080229 filed on Aug. 28, 2009, which is incorporated herein by reference for all purposes as if fully set forth herein.

BACKGROUND OF THE INVENTION

1. Field of the Invention

The present invention relates to a liquid crystal display, and more particularly, to a liquid crystal display, which can make workability easier and reduce assembly cost by connecting lamps to an external power supply.

2. Discussion of the Related Art

In general, the application scope of a liquid crystal display device has been broadening due to it characteristics of light weight, thin profile, and low power consumption. LCD devices are now used in office automation equipment, audio/video equipment, and so forth.

A liquid crystal display device includes a plurality of control switches arranged in a matrix and controls the amount of light being transmitted in accordance with a signal applied to the control switches, thereby generating a desired image. Because the liquid crystal display device is not a self luminous display device, it requires a separate light source, such as a backlight unit.

A backlight unit may be generally classified as a direct type and an edge type in accordance with the location of a light source. The edge type backlight unit has a light source along one side of a liquid crystal display device, and irradiates light from the light source to a liquid crystal panel through a light guide plate and a plurality of optical sheets. The direct type backlight unit has a plurality of light sources disposed directly under a liquid crystal panel, and irradiates light from the light sources to the liquid crystal panel through a diffusion plate and a plurality of optical sheets. Recently, the direct type backlight unit is more often used because it has improved brightness, more consistent light uniformity and better color purity, as compared to the edge type backlight.

A cold cathode fluorescent lamp (hereinafter, referred to as "CCFL") and an external electrode fluorescent lamp (hereinafter, referred to as "EEFL") are mainly used as a light source of a backlight unit. As an EEFL has its electrodes exposed at the exterior thereof, EEFLs can be driven in parallel more easily compared to a CCFL in which electrodes are inserted into a glass tube.

FIG. 1 shows a related art method for connecting lamps and an external power supply in a direct type LCD. The lamps are implemented in EEFLs, and the electrodes 1 of the lamps are elastically pressed against conductive clips 2 and electrically connected to a common electrode 4 secured on a common board 3. And, the electrodes of the lamps 1 are supported and fixed by a side support 5. The common board 3 is a molded object made of plastic and supported by a bottom cover 9. A lamp wire 9 connects the common electrode 4 and an inverter (not shown) to each other to transmit a lamp driving power generated from the inverter to the common electrode 4.

The connection method shown in FIG. 1 is advantageous in terms of safety, but has low assemblability because screw fastening 6 and spot welding 7 are required when connecting the lamp wire 8 to the common electrode 4. Moreover, this method is not compatible with a recently proposed IPB (Integrated Power Board) Model. The IPB model has an inverter, which has been separately provided in the conventional art, integrated in the power board of a system to make LCDs slimmer and make assembling convenient. Therefore, if the assembling of a liquid crystal module without an inverter is completed by a module manufacturing company, a set manufacturer assembles an integrated power board to the liquid crystal module to supply lamp driving power to lamps. In such an IPB model, an integrated power board and lamps are electrically connected by pin connector connection in order to make assembling simple. However, the connection method as shown in FIG. 1 does not allow for connector connection, thereby lowering model compatibility.

SUMMARY OF THE INVENTION

An aspect of this document is to provide a liquid crystal display, which can make workability easier and reduce assembly cost by connecting lamps to an external power supply.

Another aspect of this document is to provide a liquid crystal display which enables commoditization of parts and improves assemblability by being made compatible with an IPB model.

In order to achieve the above aspects, there is provided a liquid crystal display according to an exemplary embodiment of the present invention, including: a liquid crystal panel; a plurality of lamps for generating light to be irradiated onto the liquid crystal panel; a common board including a common electrode contacting the electrodes of the lamps; a bottom cover accommodating the lamps and the common board; and a socket connector provided at one side of the common board and electrically connecting an external power supply and the common electrode, wherein an electrical contact portion of the socket connector is exposed to the outside by a through hole passing through the common board and the bottom cover.

The socket connector includes a housing integrated with the common board and a terminal supported by the housing.

The housing is a molded object made of insulating material, and has an internal space for passing part of the terminal therethrough and inserting a plug connector connected to the external power supply therein.

The terminal includes: a first contact portion electrically contacting the plug connector; a second contact portion contacting the common electrode; and a body portion bent along the surface of the housing and connecting the first and second contact portions.

The first contact portion is inserted into the through hole along the internal space, and the second contact portion is connected to the common electrode by screw fastening.

The first contact portion consists of at least two pins.

Each of the electrodes of the lamps is elastically pressed against a conductive clip, and the conductive clip is integrated with the common electrode.

Each of the lamps is an external electrode fluorescent lamp.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENT

Hereinafter, an implementation of this document will be described with reference to FIGS. 2 to 8.

Figure 1:
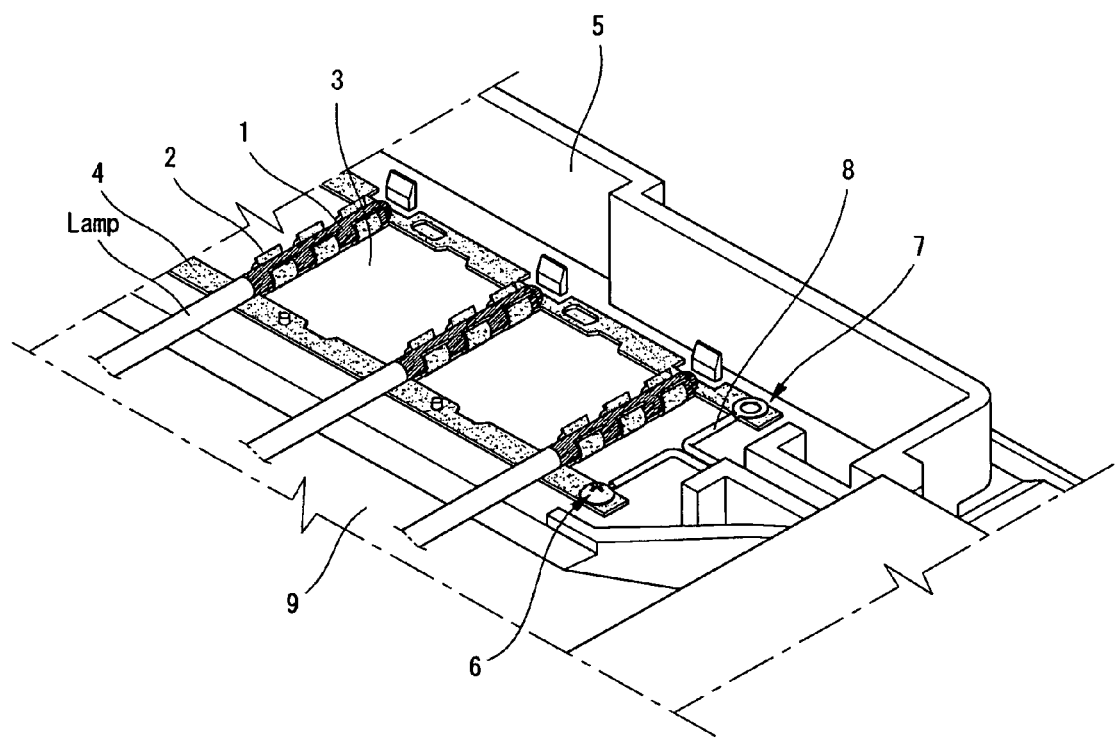
FIG. 1 is a view showing a connection between lamps and an external power supply in a related art direct type LCD.
Figure 2:
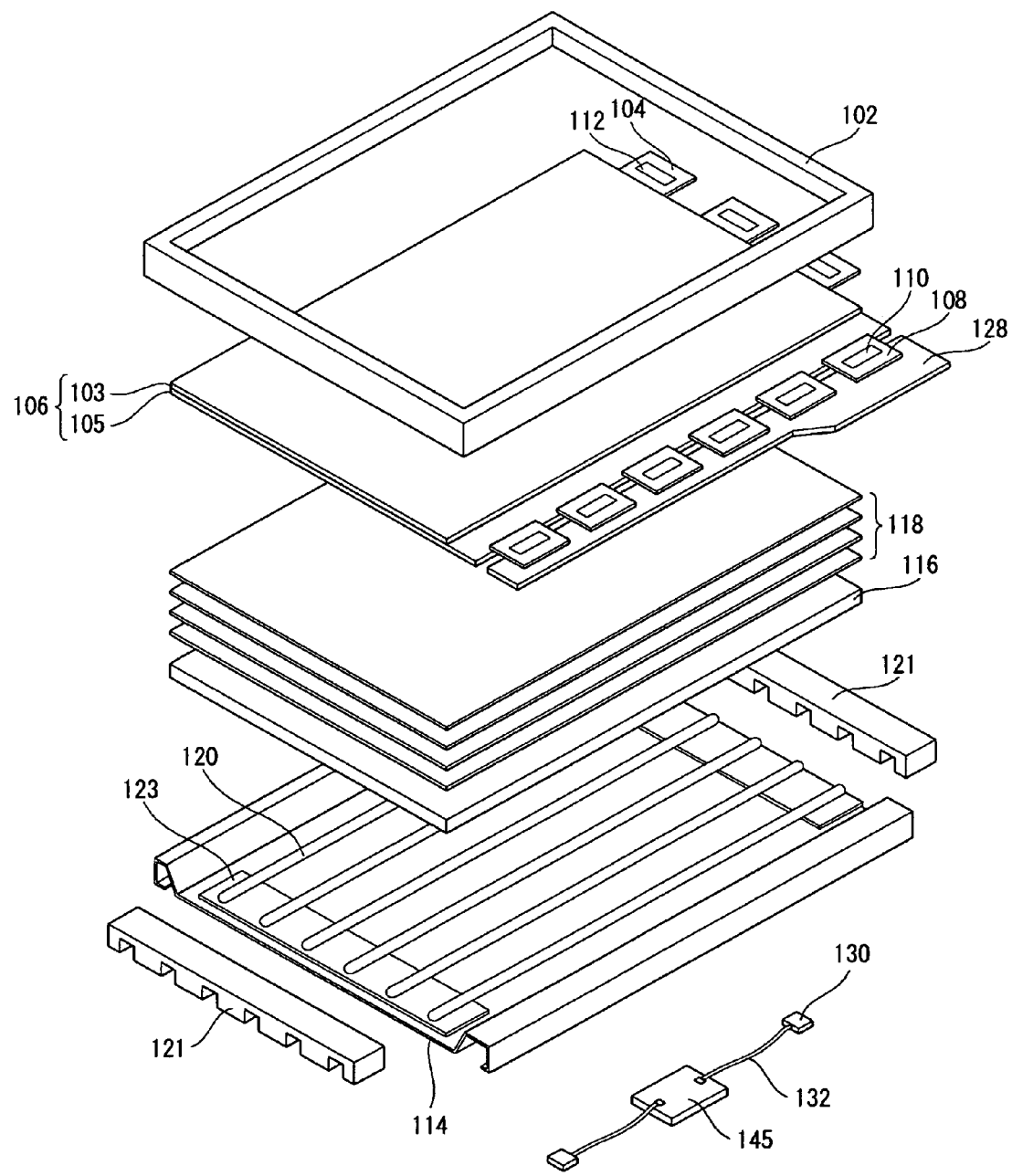
FIG. 2 is an exploded perspective view of a liquid crystal display according to an exemplary embodiment of the present invention.

FIG. 2 shows a liquid crystal display according to an exemplary embodiment of the present invention.

Referring to FIG. 2, a liquid crystal display according to an exemplary embodiment of the present invention comprises a top case 102, a liquid crystal panel 106, a backlight unit, and an integrated power board 145.

The top case 102 has a rectangular frame, and surrounds the edges of the liquid crystal panel 106 and the backlight unit.

The liquid crystal panel 106 comprises an upper substrate 103 and a lower substrate 105. A liquid crystal layer (not shown) is formed between the upper substrate 103 and the lower substrate 105. The liquid crystal panel 106 is provided with a spacer (not shown) for maintaining a constant gap between the upper substrate 103 and the lower substrate 105.

The upper substrate 103 is provided with a color filter, a common electrode, and a black matrix (not shown). The common electrode may be formed on the lower substrate 105 according to an electric field driving method. Signal lines, such as a data line and a gate line (not shown), are formed on the lower substrate 105 of the liquid crystal panel 106. A thin film transistor (hereinafter, referred to as "TFT") is formed at a crossing of the data line and the gate line. The TFT switches a data signal to be transmitted from the data line to the liquid crystal cell in response to a scanning signal (i.e., a gate pulse) from the gate line. A pixel electrode is formed at a pixel area between the data line and the gate line.

One side of the liquid crystal panel 106 is provided with data and gate pad areas, respectively. A plurality of tape carrier packages (hereinafter, referred to as "TCPs") 104 and 108 are attached to the data and gate pad areas at equal intervals. These TCPs 104 and 108 electrically connect a source PCB 128 and data pads. The TCPs 104 and 108 include data TCPs 108 which have data driving integrated circuits 110 mounted thereon for supplying video signals to the data lines and gate TCPs 104 which have data gate drive integrated circuits 112 mounted thereon for supplying gate signals to the gate lines. In a GIP (Gate In Panel) method, the gate TCPs 104 may be omitted.

The backlight unit comprises a plurality of lamps 120 arranged side by side, for irradiating light to the liquid crystal panel 106, a guide support 121 for inserting the lamps 120 therein and covering the edges of the lamps 120, a bottom cover 114 arranged at the back surface of the lamps 120, for accommodating the lamps 120, a diffusion plate 116 arranged at the front surface of the lamps 120, for diffusing the light generated from the lamps 120, and a plurality of optical sheets 118 for vertically raising the traveling path of the light accumulated and incident on the diffusion plate 116 toward the liquid crystal panel 106.

The lamps 120 may include EEFLs having electrodes exposed to the outside. The electrodes of the lamps 120 are commonly connected by being conducted to each other on the common board 123. A socket connector is formed at one side of the common board 123. The socket connector is coupled to a plug connector 130 and applies a lamp driving power from the integrated power board 145 to the common electrode of the common board 123. The common board 123 and the socket connector will be described in detail later with reference to FIGS. 3 to 7.

The bottom cover 114 accommodates the lamps 120 and the common board 123. A reflective sheet (not shown) may be adhered to the inner surface of the bottom cover 114 facing the lamps 120.

The diffusion plate 116 diffuses the light incident from the lamps 120, thereby making uniform the distribution density of the light irradiated on the liquid panel 106. The plurality of optical sheets 118 stacked on the diffusion plate 116 converts the light incident from the diffusion plate 116 to be perpendicular to the liquid crystal panel 106, thereby improving light efficiency.

The side support 121 is provided with grooves for inserting the ends of the lamps 120 therein, and supports the lamps 120 from both sides of the bottom cover 114.

The integrated power board 145 comprises an inverter to generate a lamp driving power. The integrated power board 145 is secured to the back surface of the bottom cover 114 by a set manufacturer after completion of assembling of a liquid crystal module. For electrical connection with the lamps, a cable 132 and the plug connector 130 are connected to the integrated power board 145.

Figure 3:
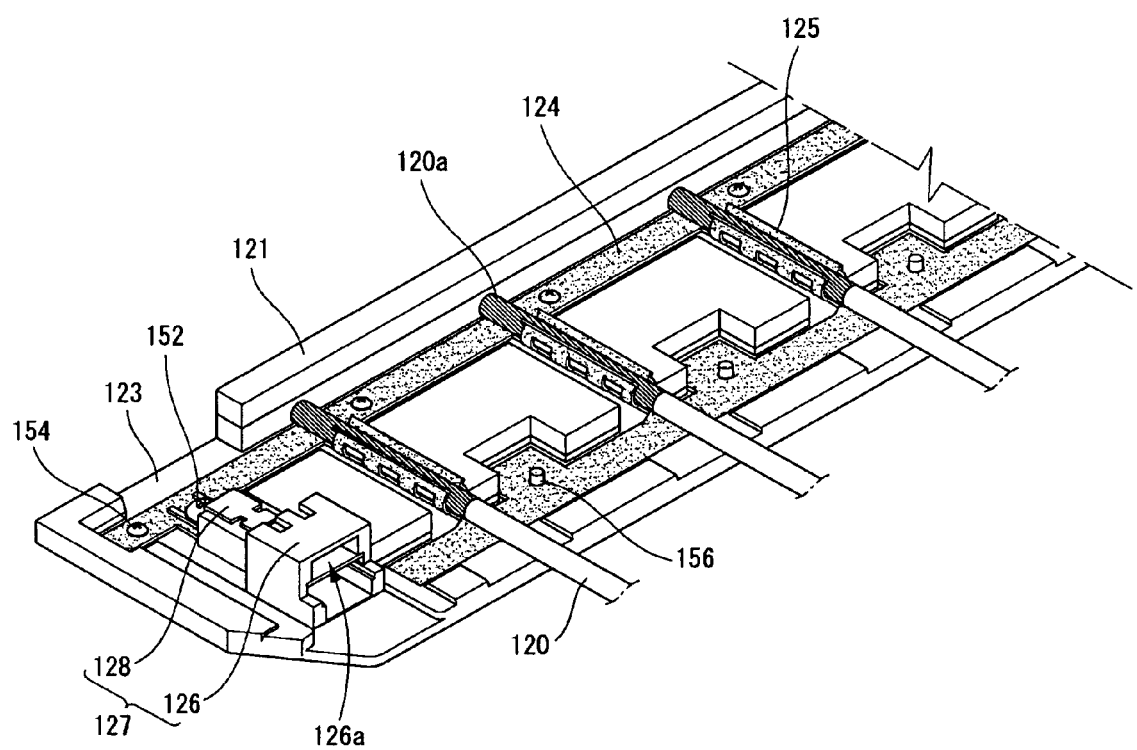
FIG. 3 is a view showing one example of a common board with a socket connector formed thereon.

FIG. 3 shows one example of a common board 123 with a socket connector formed thereon.

Referring to FIG. 3, the electrodes 120a of the lamps 120 are elastically pressed against conductive clips 125 and electrically connected to a common electrode 124 secured on a common board 123. The conductive clips 125 are integrated with the common electrode 124. Therefore, in the present invention, unlike a recently proposed balance PCB type, a separate SMT (Surface Mount Technology) process for attaching the conductive clips 125 to a balance PCB (Printed Circuit Board) can be omitted, thus greatly reducing the costs and further easily solving the safety problem caused by defective soldering of the SMT. The common electrode 124 can be fixed onto the common board 123 by screw fastening 154 or hook fastening 156.

A socket connector 127 is formed at one side of the common board 123, and is coupled to a plug connector 130, which is inserted through the bottom cover 114 and the common board 123, to transmit a lamp driving power from the plug connector 130 to the common electrode 124.

Figure 4:
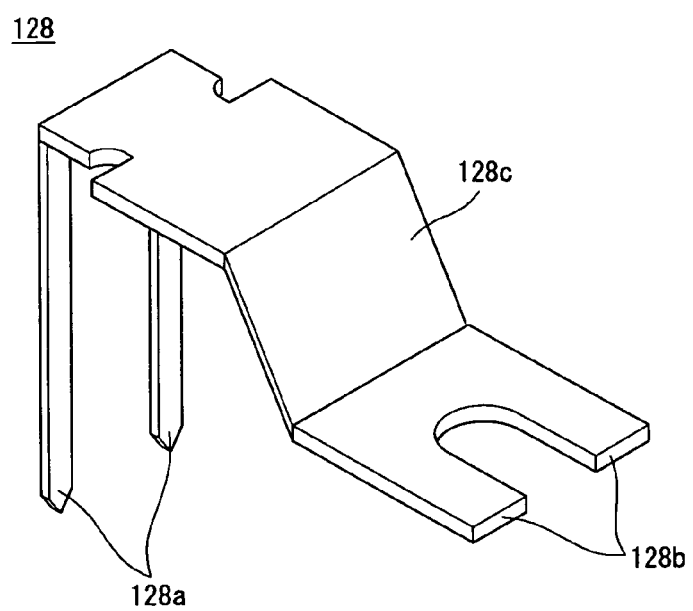
FIG. 4 is a perspective view showing in detail a terminal of the socket connector of FIG. 3.
Figure 5:
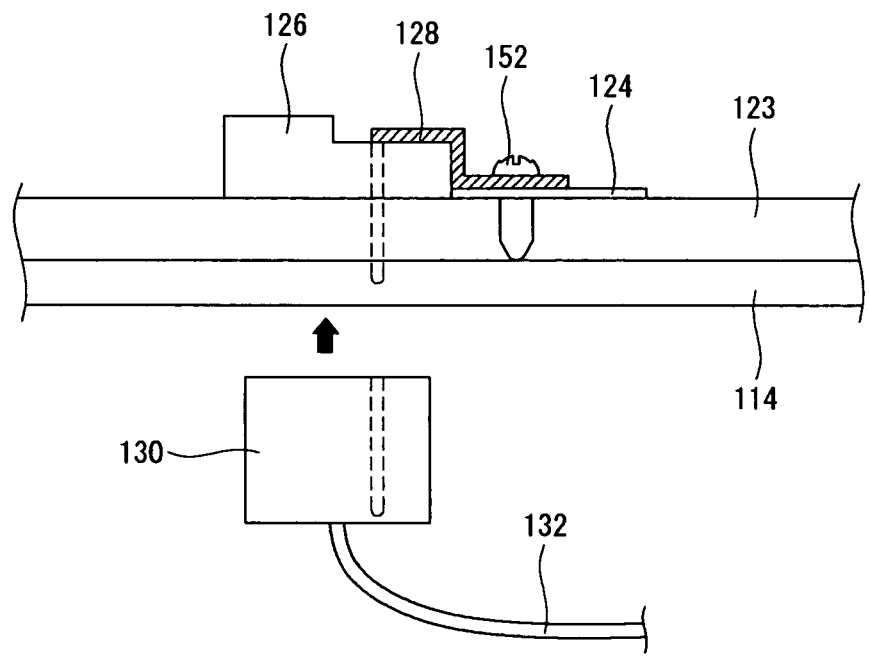
FIG. 5 is a cross-sectional view for explaining a connection between the socket connector and a plug connector.

To this end, the socket connector 127 has a housing 126 integrated with the common board 123 and a terminal 128 supported by the housing 126. The housing 126 is a mold object made of insulating material, such as plastic, and is molded by being integrated with the common board 123 at the time of manufacturing of the common board 123. The housing 126 has an internal space 126a for passing part of the terminal 128 therethrough and inserting the plug connector 130 for electrical contact. The internal space 126a is externally exposed through a through hole (not shown) pierced in the common board 123 and the bottom cover 114. As shown in FIGS. 4 and 5, the terminal 128 comprises a first contact portion 128a electrically contacting the plug connector 130, a second contact portion 128b contacting the common electrode 124, and a body portion 128c bent along the surface of the housing 126 and connecting the first contact portion 128a and the second contact portion 128b. The first contact portion 128a is inserted into the through hole along the internal space 126a of the housing 126. The first contact portion 128a consists of two pins for connecting with the plug connector 130. The second contact portion 128b is connected to the common electrode by fastening a screw 152.

Figure 6:
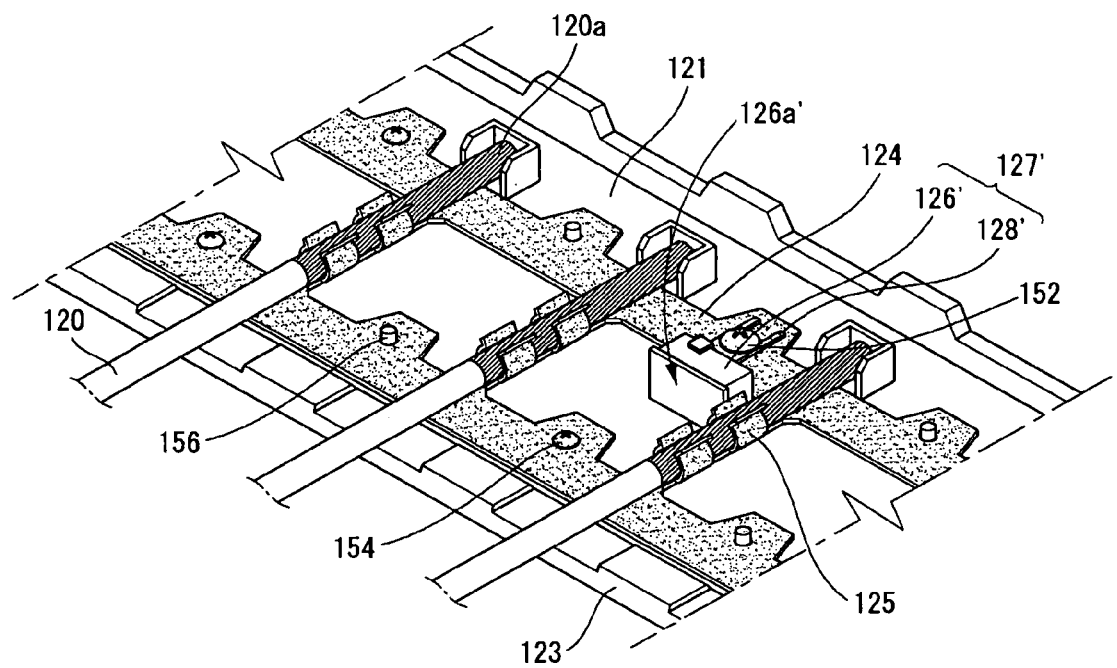
FIG. 6 is a view showing another example of a common board with a socket connector formed thereon.
Figure 7:
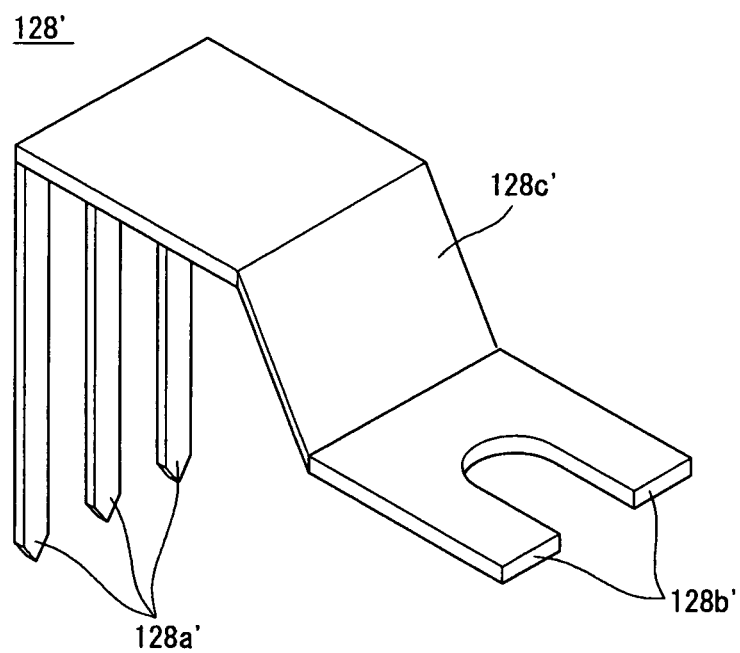
FIG. 7 is a perspective view showing in detail a terminal of the socket connector of FIG. 6.

FIG. 6 shows another example of a common board 123 with a socket connector formed thereon.

Referring to FIG. 6, the electrodes 120a of the lamps 120 are elastically pressed against conductive clips 125 and electrically connected to a common electrode 124 secured on a common board 123. The conductive clips 125 are integrated with the common electrode 124. Therefore, in the present invention, unlike a recently proposed balance PCB type, a separate SMT (Surface Mount Technology) process for attaching the conductive clips 125 to a balance PCB (Printed Circuit Board) can be omitted, thus greatly reducing the costs and further easily solving the safety problem caused by defective soldering of the SMT. The common electrode 124 can be fixed onto the common board 123 by screw fastening 154 or hook fastening 156.

A socket connector 127' is formed at one side of the common board 123, and is coupled to a plug connector 130, which is inserted through the bottom cover 114 and the common board 123, to transmit a lamp driving power from the plug connector 130 to the common electrode 124.

To this end, the socket connector 127' has a housing 126' integrated with the common board 123 and a terminal 128' supported by the housing 126'. The housing 126' is a mold object made of insulating material, such as plastic, and is molded by being integrated with the common board 123 at the time of manufacturing of the common board 123. The housing 126' has an internal space 126a' for passing part of the terminal 128' therethrough and inserting the plug connector 130 for electrical contact. The internal space 126a' is externally exposed through a through hole (not shown) pierced in the common board 123 and the bottom cover 114. As shown in FIGS. 4 and 5, the terminal 128' comprises a first contact portion 128a' electrically contacting the plug connector 130, a second contact portion 128b' contacting the common electrode 124, and a body portion 128c' bent along the surface of the housing 126 and connecting the first contact portion 128a and the second contact portion 128b'. The first contact portion 128a' is inserted into the through hole along the internal space 126a' of the housing 126'. The first contact portion 128a' consists three pins for connecting with the plug connector 130. The second contact portion 128b' is connected to the common electrode 124 by fastening a screw 152.

Figure 8:
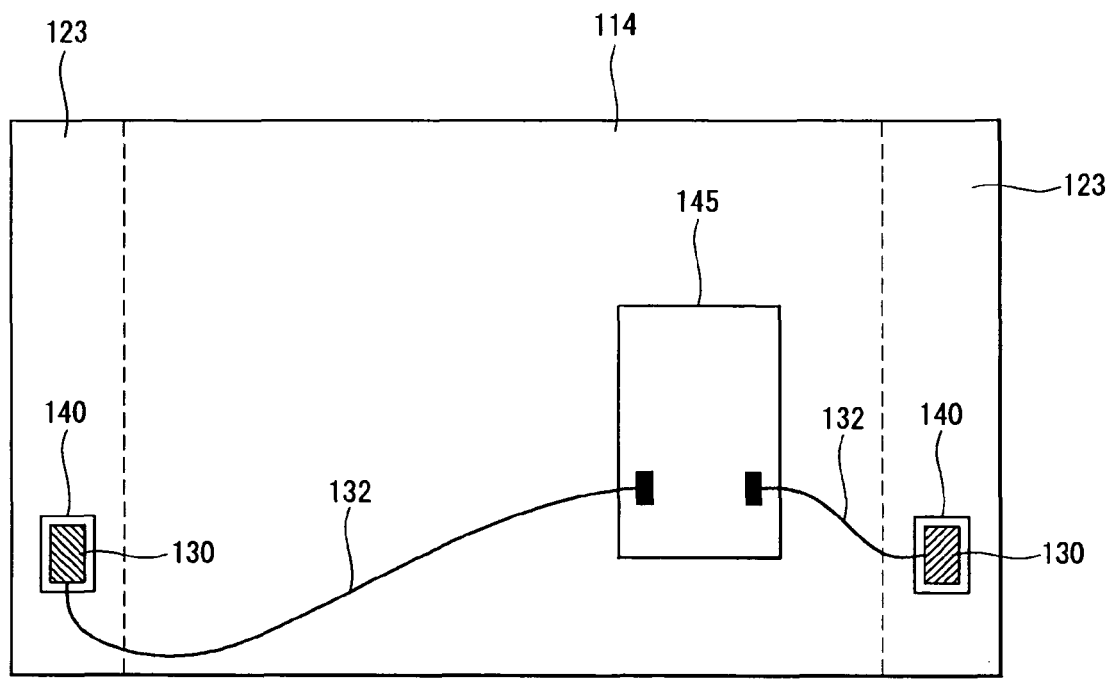
FIG. 8 is a plane view showing a connected state of the plug connector on the back surface of a bottom cover.

FIG. 8 is shows a connected state of the plug connector 130 on the back surface the bottom cover 114.

Referring to FIG. 8, the plug connector 130 is connected to the terminal (first contact portion) of the socket connector exposed through the through hole 140, thus enabling it to apply a lamp driving power from the integrated power board 145 applied through the cable 132 to the common electrode of the common board 123.

As described above, the liquid crystal display according to the present invention can make workability easier because of its simple structure when connecting lamps and an external power supply, and can reduce assembling cost to a large extent and ensure safety in terms of quality from defective soldering because an SMT soldering process is not required.

Furthermore, the liquid crystal display according to the present invention is compatible with an IPB model because it allows for connector connection when connecting lamps and an external power supply, and accordingly can greatly contribute to commoditization of parts and improvement of assemblability.

From the foregoing description, it will be apparent to those skilled in the art that various modifications and variations can be made without departing from the technical idea of the invention. Accordingly, the technical scope of the present invention should be defined by the accompanying claims, rather than defined by the detailed description of the specification.

What is claimed is:

1. A liquid crystal display comprising:
a liquid crystal panel;
a plurality of lamps for generating light to be irradiated onto the liquid crystal panel;
a common board including a common electrode contacting the electrodes of the lamps;
a bottom cover accommodating the lamps and the common board;
an integrated power board supplying a lamp driving power to a plug connector; and
a socket connector provided at one side of the common board and electrically connected to the plug connector, which is inserted through the bottom cover and the common board, to transmit the lamp driving power supplied from the plug connector to the common electrode,
wherein each of the electrodes of the lamps is elastically pressed against a conductive clip, and the conductive clip and the common electrode are integrally molded,
wherein the socket connector comprises a housing integrated with the common board and a terminal supported by the housing, and
wherein the terminal comprises:
a first contact portion including contact pins that are extended in a first direction parallel to each other and, electrically contacted to the plug connector via a through hole passing through the bottom cover and the common board;
a second contact portion including a first horizontal surface that is extended in a second direction perpendicular to the first direction, and contacted to the common electrode; and
a body portion including a second horizontal surface that is bent and angled from the first horizontal surface, and is positioned at a height different from the first horizontal surface, and connects the first contact portion to the second contact portions,
wherein the terminal is spaced from the conductive clip.

2. The liquid crystal display of claim 1, wherein the housing is a molded object made of insulating material, and has an internal space for passing part of the terminal therethrough and inserting the plug connector.

3. The liquid crystal display of claim 2, wherein the first contact portion is inserted into the through hole along the internal space, and the second contact portion is connected to the common electrode by screw fastening.

4. The liquid crystal display of claim 1, wherein the first contact portion consists of at least two pins.

5. The liquid crystal display of claim 1, wherein each of the lamps is an external electrode fluorescent lamp.

* * * * *